United States Patent
Meng et al.

(10) Patent No.: US 11,599,655 B1
(45) Date of Patent: Mar. 7, 2023

(54) DATA SHARING METHOD

(71) Applicant: Amazon Technologies, Inc., Seattle, WA (US)

(72) Inventors: Xianrui Jeri Meng, Newcastle, WA (US); Matthew John Campagna, Bainbridge Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 160 days.

(21) Appl. No.: 16/138,875

(22) Filed: Sep. 21, 2018

(51) Int. Cl.
| | |
|---|---|
| *G06F 21/62* | (2013.01) |
| *H04L 9/06* | (2006.01) |
| *H04L 9/08* | (2006.01) |
| *G06K 9/62* | (2022.01) |
| *G06F 16/907* | (2019.01) |
| *G06Q 50/00* | (2012.01) |

(52) U.S. Cl.
CPC ........ *G06F 21/6218* (2013.01); *G06F 16/907* (2019.01); *G06K 9/6231* (2013.01); *H04L 9/0643* (2013.01); *H04L 9/0819* (2013.01); *G06Q 50/01* (2013.01)

(58) Field of Classification Search
CPC .... G06F 21/6218; G06F 21/60; G06F 21/606; G06F 16/907; G06K 9/6231; H04L 9/0643; H04L 9/0819; G06Q 50/01
USPC ........................................................ 707/722
See application file for complete search history.

(56) References Cited

U.S. PATENT DOCUMENTS

| | | | | |
|---|---|---|---|---|
| 8,572,405 | B2* | 10/2013 | Kerschbaum | H04L 9/00 380/255 |
| 9,462,342 | B2* | 10/2016 | Krishnamurthy | H04N 21/47202 |
| 10,135,932 | B1* | 11/2018 | Liu | H04L 67/75 |
| 10,268,775 | B2* | 4/2019 | Aad | G06F 16/901 |
| 10,600,076 | B2* | 3/2020 | Mirisola | G06Q 30/0245 |
| 2009/0296906 | A1* | 12/2009 | Kuroda | H04M 7/0027 379/201.01 |
| 2014/0237623 | A1* | 8/2014 | Saldamli | H04W 12/03 726/27 |
| 2015/0149763 | A1* | 5/2015 | Kamara | H04W 4/02 713/150 |

(Continued)

OTHER PUBLICATIONS

"Malicious-Secure Private Set Intersection via Dual Exacution;" Peter Rindal, Mike Rosulek; Aug. 9, 2017; ACM.*

(Continued)

*Primary Examiner* — Giovanna B Colan
(74) *Attorney, Agent, or Firm* — Davis Wright Tremaine LLP

(57) ABSTRACT

A first entity having a first set of tagged data and a second entity having a second set of tagged data share data that is selected based on a set of common tags present in both the first and second sets of tagged data. The set of common tags is determined using a private set intersection protocol that, in many examples, preserves the privacy of the two entities. In an embodiment, each entity identifies a set of data objects associated with the set of common tags, and another private set intersection protocol is performed to identify a set of common data objects available to both entities. Each entity provides, to the other entity, those data objects associated with the set of common tags that are not in the set of common data objects available to both entities thereby providing a matching set of data objects to both entities.

20 Claims, 9 Drawing Sheets

(56) References Cited

U.S. PATENT DOCUMENTS

2015/0288632 A1* 10/2015 Zheng .................. H04L 67/141
 709/206
2016/0323102 A1* 11/2016 Freudiger ........... G06F 21/6254

OTHER PUBLICATIONS

"Phasing: Private Set Intersection using Permutation-based Hashing;" Benny Pinkas, Thomas Schneider, Michael Zohner, Gil Segev; Paper included in the Proceedings of the 24th USENIX Security Symposium Aug. 12-14, 2015, Washington, D.C.*

"Phasing: Private Set Intersection using Permutation-based Hashing;" Benny Pinkas, Thomas Schneider, Michael Zohner, Gil Segev; Paper included in the Proceedings of the 24* USENIX Security Symposium Aug. 12-14, 2015, Washington, D.C. (Year: 2015.*

"Malicious-Secure Private Set Intersection vial Dual Execution;" Peter Rindal, Mike Rosulek; 2017, Dallas; Texas.*

Dachman-Soled, D., et al., "Efficient Robust Private Set Intersection," M. Abdalla, et al. (eds.), Applied Cryptography and Network Security, Lecture Notes in Computer Science, 5536:125-142, Springer, Berlin, Heidelberg, 2009.

Dachman-Soled, D., et al., "Secure Efficient Multiparty Computing of Multivariate Polynomials and Applications," J. Lopez, et al. (eds.), Applied Cryptography and Network Security, Lecture Notes in Computer Science, 6715:130-146, Springer, Bedin, Heidelberg, 2011.

De Cristofaro, E. and G. Tsudik, "Practical Private Set Intersection Protocols with Linear Computational and Bandwidth Complexity," R. Sion (ed.), Financial Cryptography and Data Security, Lecture Notes in Computer Science, 6052:143-159, Springer, Bedin, Heidelberg, 2010.

Freedman, M. J., et al., "Efficient Private Matching and Set Intersection," C. Cachin, J.L. Camenisch (eds.), Advances in Cryptology—Eurocrypt 2004, Lecture Notes in Computer Science, 3027:1-19, Springer, Berlin, Heidelberg, 2004.

Pinkas, B., et al., "Phasing: Private Set Intersection Using Permutation-Based Hashing," Proceedings of the 24th USENIX Security Symposium, Washington, D.C., Aug. 12-14, 2015, pp. 515-530.

Rindal, P. and M. Rosulek, "Improved Private Set Intersection Against Malicious Adversaries," J.S. Coron, J. Nielsen (eds.), Advances in Cryptology—Eurocrypt 2017, Lecture Notes in Computer Science, 10210:235-259, 2017.

Rindal, P. and M. Rosulek, "Malicious-Secure Private Set Intersection via Dual Execution," Proceedings of the 2017 ACM SIGSAC Conference on Computer and Communications Security, Dallas, TX, Oct. 30-Nov. 3, 2017, pp. 1229-1242.

* cited by examiner

DATA SHARING METHOD

BACKGROUND

Information sharing is an important aspect of personal computing today. Many users have access to multiple devices that allow them to collect and share information. It is not uncommon for a user to have a personal computer, a work computer, a tablet computer, a cell phone, and an Internet-connected car. These devices allow the user to collect photographs, sound clips, video, text messages, tweets, and social media posts throughout their daily life, and share them with friends and family. As the amount of information collected and shared increases, it can become increasingly difficult to determine what to share and who to share that information with.

BRIEF DESCRIPTION OF THE DRAWINGS

Various techniques will be described with reference to the drawings, in which.

DETAILED DESCRIPTION

Figure 1:
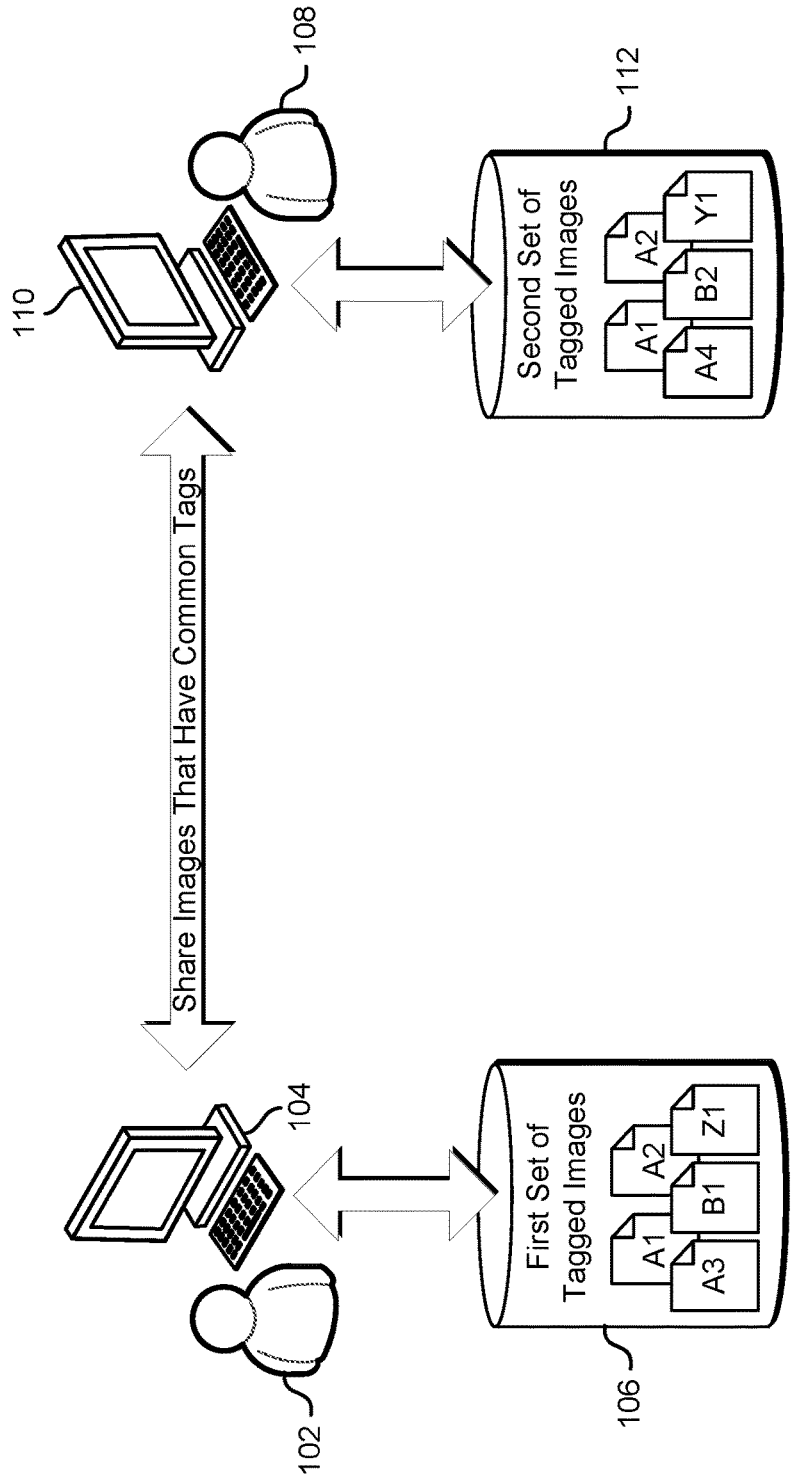
FIG. 1 illustrates an example of a system that shares tagged image files between two parties, in an embodiment.

The present document describes a system for sharing tagged data objects while maintaining the privacy of the parties to the sharing operation. Examples of tagged data objects include tagged image data objects (such as image files, GIF images, or BMP images), tagged video data objects (such as MOV video files), tagged music data objects (such as MP3 music files), tagged multimedia objects, tagged data objects, or tagged social media posts (such as Tweets or Facebook posts). Tags can represent a variety of information such as faces recognized in an image, geographical locations, creation or modification times, artists, albums, genres, video or image encoding parameters, image resolutions, frame rates, or author information. The parties to the sharing operation may be any combination of mobile devices, client computer systems, server computer systems, cellular phones, tablet computer systems, wearable devices, smart watches, digital cameras, digital video recorders, sound recorders, or media players.

In one example, a first entity and a second entity each maintain a different set of tagged data. Both the first entity and the second entity identify a set of tags that are associated with data that can be shared with the other entity. Using a private set intersection ("PSI") protocol, the first entity and the second entity determine the intersection of their respective sets of tags, without revealing other tags that may be shared. Protocols for determining a private set intersection are generally well known to those in the art, and in various implementations, a variety of different private set intersection protocols may be used.

After identifying the intersection of tags, each entity identifies a set of data objects that are associated with the identified intersection of tags. The parties again execute a private set intersection process to identify data objects that are associated with the identified intersection of tags that are known by both parties. The private set intersection is determined using the content of each data object. In some examples, each entity determines a checksum, hash, or authentication code for each data object, and the intersection is determined using the aforementioned checksum, hash, or authentication code. In some implementations, the entities perform a key exchange algorithm such as a Diffie Hellman key exchange or public-private key exchange to establish a shared key. The shared key is used to determine a message authentication code for each data object of each entity, and the private set intersection of the data objects is determined using the message authentication codes. In the present document, an authentication code may be a checksum, a cyclic redundancy code, the message authentication code, a hash, a cryptographic hash, a file size, or information that can be used to validate the contents of the data object.

Using the determined intersection of data objects, each entity identifies and sends those data objects that are associated with a shared tag and that are also not already known by the other party to the other party. In various examples, data objects may be transmitted over a computer network, a wireless network, a Bluetooth connection, a near-field communication link, an infrared communication link, or transferred via a music sharing service or a social media service. The other party adds the received data objects to its own collection of data objects, and after the exchange is complete, both parties have matching sets of data objects for the shared set of tags.

In general, since the determination of the shared tags and the determination of the shared data objects is done using a private set intersection protocol, neither party is aware of any data objects owned by the other party other than those that have been shared.

As one skilled in the art will appreciate in light of this disclosure, certain embodiments may be capable of achieving certain advantages, including some or all of the following: (1) the sharing system described herein allows two entities to jointly share tagged data while providing strong privacy for each individual entity, (2) the system accomplishes this strong privacy while maintaining a high level of usability that allows each entity to quickly share data objects that have common tags.

FIG. 1 illustrates an example of a system 100 that shares tagged image files between two parties, in an embodiment. In an embodiment, a first user 102 operates a first client computer system 104 that is connected to a storage device that retains a first set of tagged images 106. The first user 102 shares tagged images with a second user 108. The second user 108 operates a second client computer system 110 that has access to a second set of tagged images 112. Tagged data is stored on a data storage device. In various examples, the storage device is an online data storage service, a database, a hard disk connected to the first client computer system 104, a network storage device, or computer-readable memory. In some examples, the storage device is a network-connected remote data storage service accessed by the client computer system via a computer network.

The first client computer system 104 and the second client computer system 110 may be any combination of a personal computer system, mobile device, cell phone, tablet computer system, virtual computer system, the computing device, or service. The first client computer system 104 and the second client computer system 110 may communicate with each other via a computer network, an Ethernet network, a wireless network, a Bluetooth network, an infrared connection, a storage area network, a cellular connection, or via the exchange of physical computer-readable media such as a memory card, memory stick, or removable disk media.

Data may be tagged by the addition of identifying data to the data itself or by maintaining tag information separately, but linked to individual data objects. In some examples, tags are applied by the addition of a watermark to the data. For example, a digital watermark may be applied to an audio data object, a video data object, or an image data object. In some examples, a tag is added to the data object stored in a file by adding the tag to the name of the file. A tag may represent a version of the data object, a type of the data object, a creation or modification date associated with the data object, a subject in an image, a subject in a video, a face recognized in an image or video, an author, a social media group or thread, an album name, a genre, or a category.

In one example, the first user 102 identifies a first set of tags that is associated with data objects on the first client computer system 104, and the second user 108 identifies a second set of tags that is associated with data objects on the second computer system 110. The first client computer system 104 and the second client computer system 110 then perform a private set intersection protocol that identifies a set of shared tags that are common to both the first set of tags and the second set of tags. In some examples, the private set intersection protocol is implemented as a two-party protocol without the assistance of a third party. In other examples, the private set intersection is implemented using a trusted third party that has access to information from both parties.

The first client computer system 104 and the second client computer system 110 each identify those data objects associated with the shared set of tags. The first client computer system 104 identifies those data objects from the first set of tagged images 106 that are associated with the set of shared tags. The second client computer system 110 identifies those data objects from the second set of tagged images 112 that are associated with the set of shared tags. Using a private set intersection protocol, the first client computer system 104 and the second client computer system 110 determine a shared set of data objects that consist of an intersection of the data objects identified above.

Each client computer system identifies those data objects that are not in the shared set of data objects but are associated with the set of shared tags, and the identified data objects are transmitted to the other client computer system. When a client computer system receives one or more data objects from the other party, the data objects are added to the respective set of tagged images. After exchanging data objects, the first set of tagged images 106 and the second set of tagged images 112 each contain a matching set of data objects that are associated with the set of shared tags. Each set of data tagged images may include additional data objects that are not associated with the set of shared tags.

Figure 2:
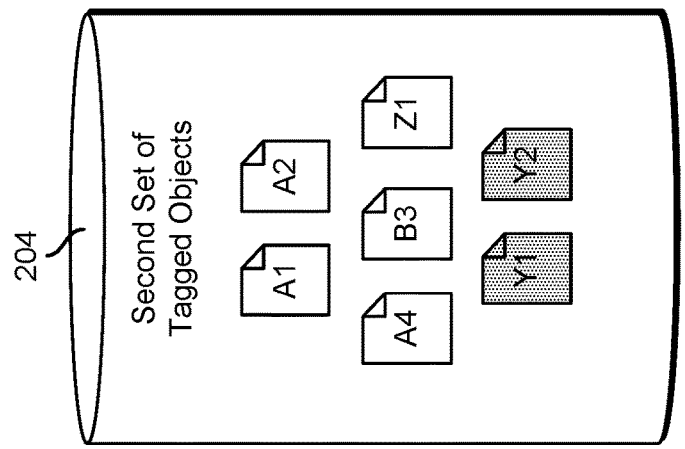
FIG. 2 illustrates an example of identifying a set of tags that are shared between two sets of tagged data objects, in an embodiment.
Figure 2:
Figure 2:
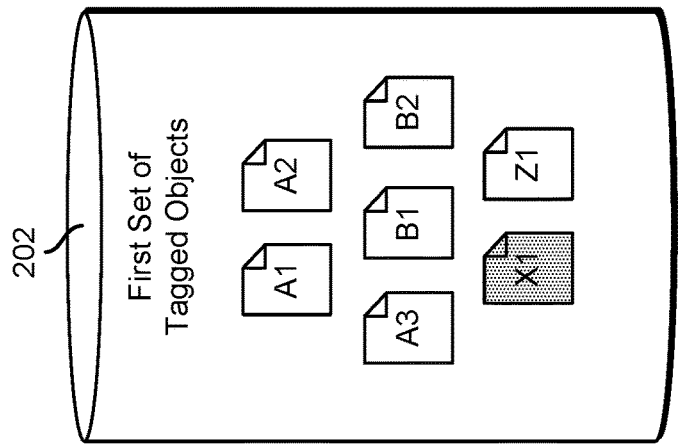

FIG. 2 illustrates an example of identifying a set of tags that are shared between two sets of tagged data objects, in an embodiment. In an embodiment, a pair of data sets 200 includes a first set of tagged data objects 202 and a second set of tagged data objects 204. The first set of tagged data objects 202 may be a first set of data objects stored on a first computer system, and the second set of tagged data objects 204 may be a second set of data objects stored on a second computer system. Each data object includes a tag identifier and an object identifier. In the example shown in FIG. 2, each data object is illustrated as having an alphabetic tag prepended to a numeric object identifier. A data object may have zero, one, or a plurality of associated tags. Tags may be alphabetic, alphanumeric, binary, or identified with a block of binary data or identifier. In some examples, tags are identified with a bit field. Tags may be stored as a part of each data object, or in some examples, a tag may be stored separately from its associated object and linked to the associated data object using a unidirectional linking pointer or bidirectional linking pointers.

In one example, the first set of tagged data objects 202 includes three data objects A1, A2, and A3 that have the tag A, two data objects B1 and B2 that have the tag B, a data object X1 that has the tag X, and a data object Z1 that has the tag Z. The second set of tagged data objects 204 includes three data objects A1, A2, and A4 that have the tag A, one data object B3that has the tag B, two data objects Y1 and Y2 that have the tag Y, and a data object Z1 that has the tag Z.

The first computer system and the second computer system determine a set of shared tags 206 that the first set of tagged data objects 202 and the second set of tagged data objects 204 have in common. The set of shared tags 206 is determined using a private set intersection protocol. Those skilled in the art are familiar with private set intersection protocols, and examples of private set intersection protocols are noted elsewhere in the present document. In an embodiment, determining the set of shared tags is accomplished by one of the two entities sharing its complete set of tags, and the other entity providing the intersection thereby preserving the privacy of one of the two entities.

In the example shown in FIG. 2, the set of shared tags 206 consists of tag A, tag B, and tag Z. In the example shown in FIG. 2, data objects that are associated with the set of shared tags 206 (A1, A2, A3, A4, B1, B2, B3, and Z1) are unshaded, and data objects that are not associated with the set of shared tags (X1, Y1, and Y2) are shaded.

Figure 3:
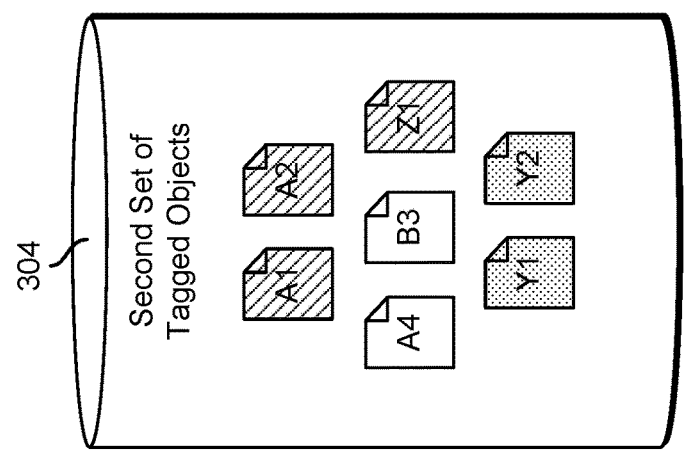
FIG. 3 illustrates an example of identifying a set of objects that are shared between two sets of tagged data objects, and that share common tags, in an embodiment.
Figure 3:
Figure 3:
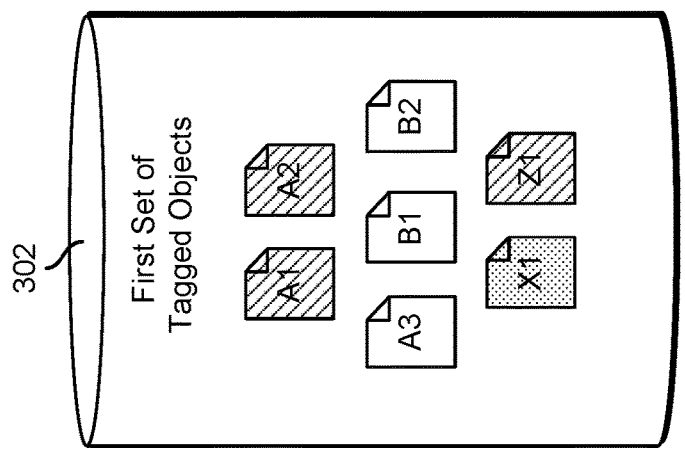

FIG. 3 illustrates an example of identifying a set of objects that are shared between two sets of tagged data objects, and that have a set of shared tags (A, B, and Z), in an embodiment. In an embodiment, a pair of data sets 300 includes a first set of tagged data objects 302 and a second set of tagged data objects 304. The first set of tagged data objects 302 may be a first set of data objects stored on a first computer system, and the second set of tagged data objects 304 may be a second set of data objects stored on a second computer system. Each data object includes a tag identifier and an object identifier. In the example shown in FIG. 3, each data object is illustrated as having an alphabetic tag prepended to a numeric object identifier. In various examples, a data object may have zero, one, or a plurality of associated tags. Tags may be alphabetic, alphanumeric, binary, or identified with a block of binary data or identifier. In an embodiment, tags may be identified with a bit field. Tags may be stored as a part of each data object or in other examples, the tag may be stored separately from its associated object and linked to the associated data object using a unidirectional linking pointer or bidirectional linking pointers.

In an example, the first set of tagged data objects 302 includes three data objects A1, A2, and A3 that have the tag A, two data objects B1 and B2 that have the tag B, a data object X1 that has the tag X, and a data object Z1 that has the tag Z. The second set of tagged data objects 304 includes three data objects A1, A2, and A4 that have the tag A, one data object B3 that has the tag B, two data objects Y1 and Y2 that have the tag Y, and a data object Z1 that has the tag Z.

In the illustrated example, the first computer system and the second computer system determine a set of common data objects 306 that have a set of shared tags (A, B, and Z as determined above). The set of common data objects 306 is determined using a private set intersection protocol. Those skilled in the art are familiar with private set intersection protocols, and examples of private set intersection protocols are noted elsewhere in the present document. In an embodiment, determining the set of common data objects is accomplished by one of the two entities sharing its complete set of data objects, and the other entity providing the intersection thereby preserving the privacy of one of the two entities. The private set intersection protocols may be mutual PSI protocols where neither party has an advantage over the other, or one-way PSI protocols where one party has a greater assurance of privacy than the other.

In various implementations, the intersection of the data objects may be determined based on a checksum, hash, or message authentication code associated with each data object. In one example, the first computer system in the second computer system negotiates a shared key using a key exchange protocol such as a Diffie Hellman key exchange protocol or an asymmetric key exchange protocol based on public-private key cryptography. The shared secret is used to generate a message authentication code or cryptographic hash of each data object so that each entity has a set of codes or hashes that correspond to the data objects of the respective entity. The intersection of the two sets of hashes or codes is determined, and the codes or hashes are used to determine the common data objects between the two entities. The use of message authentication codes or cryptographic hashes provides a level of anonymity and may render the use of a private set intersection protocol unnecessary in some applications.

In the example shown in FIG. 3, the set of common data objects 306 consists of the data objects labeled A1, A2, and Z1. In the example shown in FIG. 3, the set of common data objects 306 (A1, A2, and Z1) are shown with diagonal hashing, and data objects that are not common (A3, B1, B2, B3, and A4) are unshaded. As in FIG. 2, the data objects that are not associated with the shared tag (X1, Y1, and Y2) are shaded.

Figure 4:
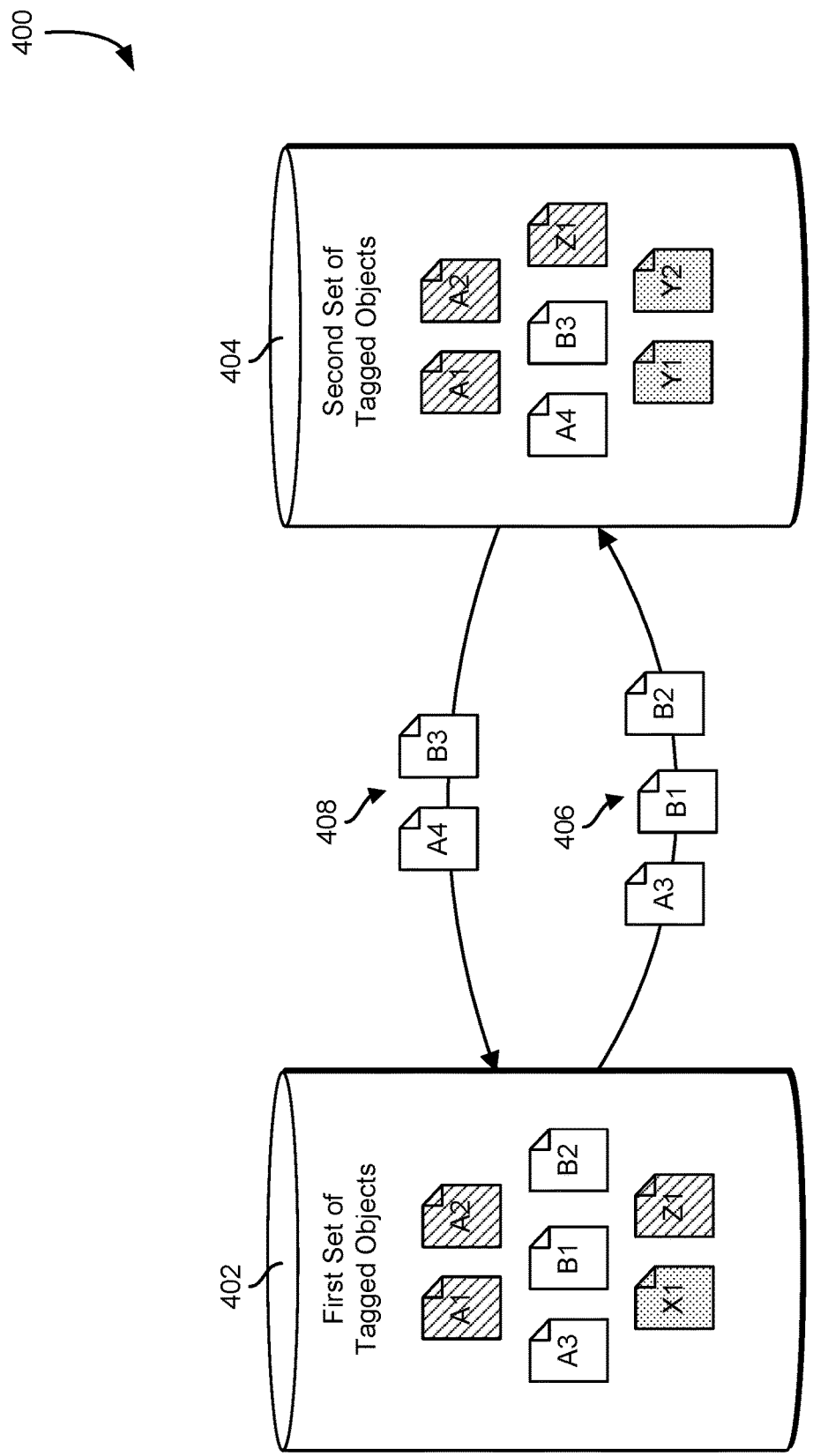
FIG. 4 illustrates an example of objects that are transferred between the two sets of tagged data objects in order to synchronize objects having a set of shared tags, in an embodiment.

FIG. 4 illustrates an example of data objects that are transferred between the two sets of tagged data objects in order to synchronize objects having a set of shared tags (A, B, and Z), in an embodiment. A pair of data sets 400 includes a first set of tagged data objects 402 and a second set of tagged data objects 404. The first set of tagged data objects 402 may be a first set of data objects stored on a first computer system, and the second set of tagged data objects 404 may be a second set of data objects stored on a second computer system. Each data object includes a tag identifier and an object identifier. In the example shown in FIG. 4, each data object is illustrated as having an alphabetic tag prepended to a numeric object identifier. In some examples, a data object may have zero, one, or a plurality of associated tags. Tags may be alphabetic, alphanumeric, binary, or identified with a block of binary data or identifier. In an embodiment, tags may be identified with a bit field. Tags may be stored as a part of each data object or, a tag may be stored separately from its associated object and linked to the associated data object using a unidirectional linking pointer or bidirectional linking pointers.

In the example illustrated in FIG. 4, the first set of tagged data objects 402 includes three data objects A1, A2, and A3 that have the tag A, two data objects B1 and B2 that have the tag B, a data object X1 that has the tag X, and a data object Z1 that has the tag Z. The second set of tagged data objects 404 includes three data objects A1, A2, and A4 that have the tag A, one data object B3 that has the tag B, two data objects Y1 and Y2 that have the tag Y, and a data object Z1 that has the tag Z.

As described above and shown in the associated figures, the first computer system and the second computer system determine a set of common data objects that have a set of shared tags (A1, A2, and Z1 as determined above, and indicated by diagonal shading in FIG. 4). Data objects X1, Y1, and Y2 are data objects that are not associated with the set of shared tags (indicated by shading in FIG. 4). The first computer system and the second computer system each determine, from their respective sets of data objects, those data objects that are associated with the set of shared tags but are not in the set of common data objects. The first computer system identifies a first set of data objects 406 (A3, B1, and B2 indicated as unshaded in FIG. 4). The second computer system identifies a second set of data objects 408 (A4 and B3 indicated as unshaded in FIG. 4). The set of data objects to be transmitted to the other party are determined by first identifying the set of data objects that have a shared tag, and then removing the data objects found to be in common as illustrated in FIG. 3. Each entity sends the respective identified data objects to the other entity, and the receiving entity adds the received data objects to their respective set of tagged objects.

Figure 5:
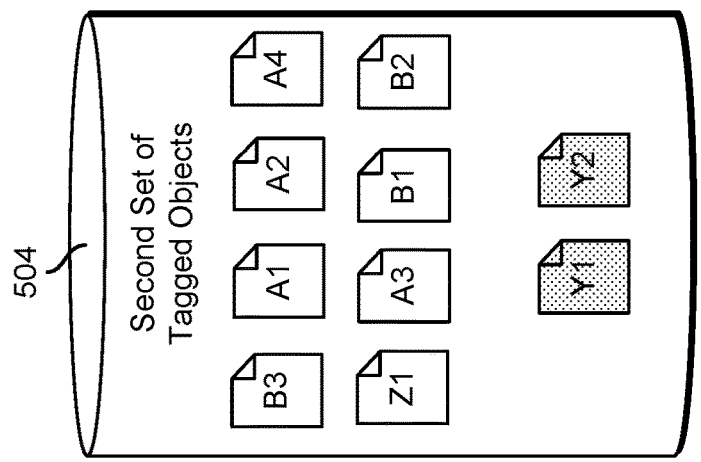
FIG. 5 illustrates an example of two sets of tagged data objects, after the sharing process is complete, in an embodiment.
Figure 5:
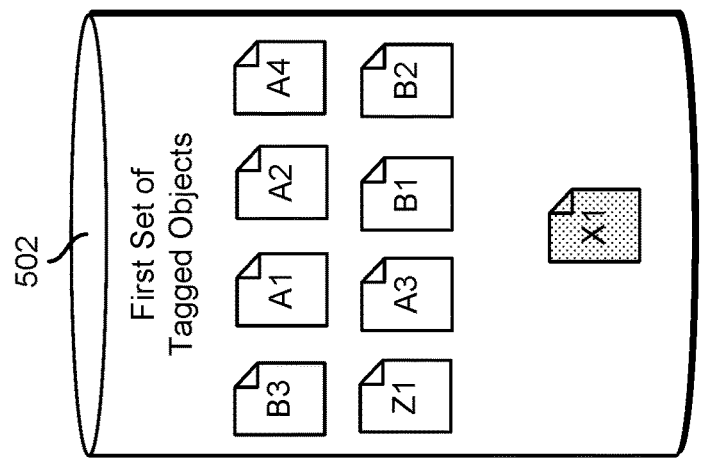

FIG. 5 illustrates an example of two sets of tagged data objects that are produced by the sharing process illustrated and described above, in an embodiment. A pair of data sets 500 includes a first set of tagged data objects 502 and a second set of tagged data objects 504. The first set of tagged data objects 502 is a first set of data objects stored on a first computer system, and the second set of tagged data objects 504 is a second set of data objects stored on a second computer system. Each data object includes a tag identifier and an object identifier. In the example shown in FIG. 5, each data object is illustrated as having an alphabetic tag prepended to a numeric object identifier. A data object may have zero, one, or a plurality of associated tags. Tags may be alphabetic, alphanumeric, binary, or identified with a block of binary data or identifier. In some examples, tags may be identified with a bit field. Tags may be stored as a part of each data object or in other examples, a tag may be stored separately from its associated object and linked to the associated data object using a unidirectional linking pointer or bidirectional linking pointers.

In various examples, the first computer system and the second computer system identify a set of shared tags, identify data objects associated with the set of shared tags which are in common to both sets of tagged data, and then exchange those data items that are not in common. The process results in each set of tagged data objects having a matching set of data objects for those tags that are shared between the two sets. For example, the result of the exchange illustrated in FIGS. 2-4 is shown in FIG. 5. In FIG. 5, the first set of tagged data objects 502 includes four data objects A1, A2, A3, and A4 that have the tag A, three data objects B, B2, and B3 that have the tag B, a data object X1 that has tag X, and a data object Z1 that has the tag Z. In FIG. 5, the second set of tagged data objects 504 includes four data objects A1, A2, A3, and A4 that have the tag A, three data objects B, B2, and B3 that have the tag B, and two data objects Y1 and Y2 that have the tag Y.

Figure 6:
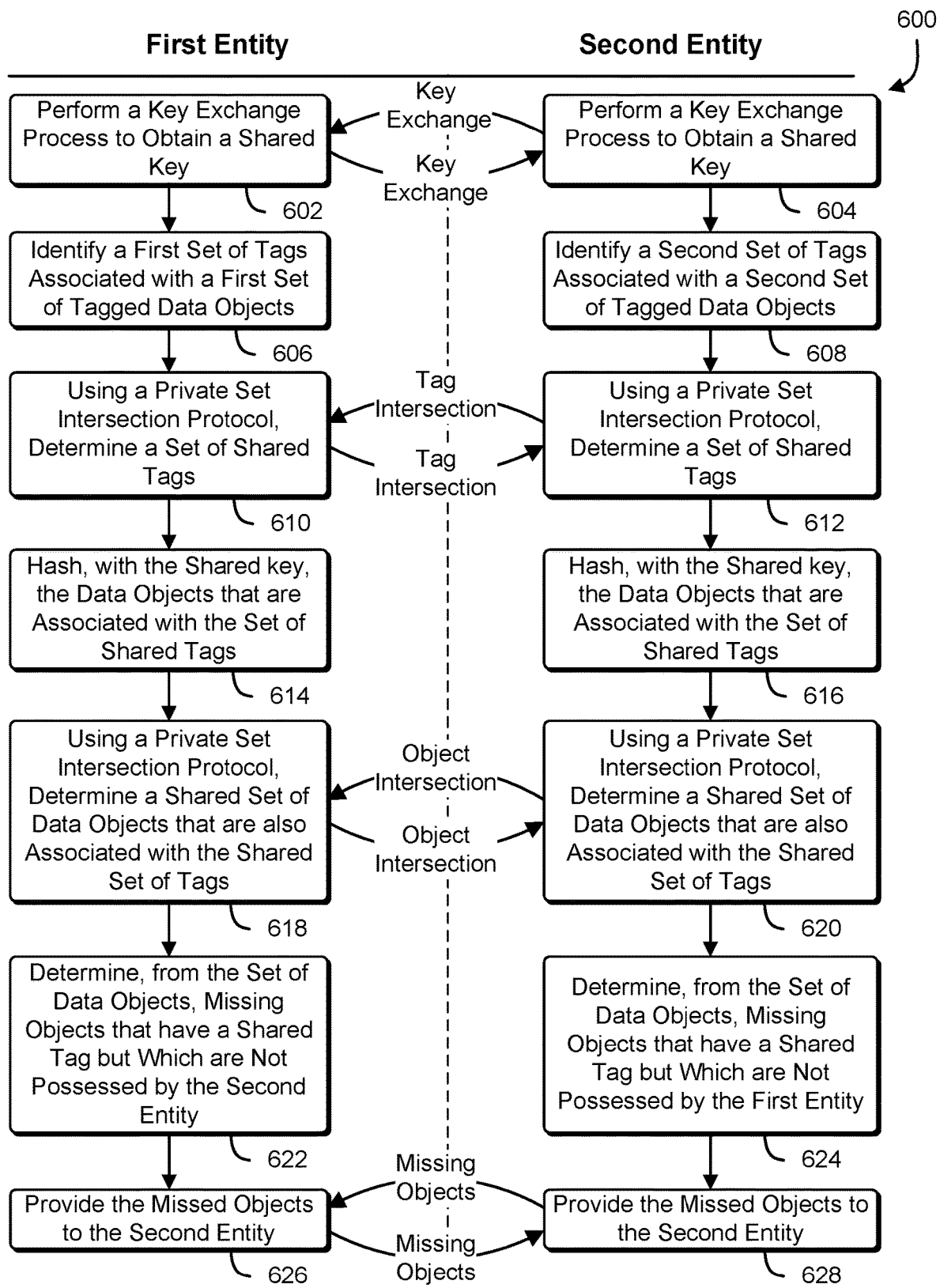
FIG. 6 illustrates a process that, as a result of being performed by a first entity and a second entity, shares data objects between the two entities that have common tags, in an embodiment.

FIG. 6 illustrates a process 600 that, as a result of being performed by a first entity and a second entity, shares tagged data objects that have common tags between the two entities, in an embodiment. Tagged data may take a variety of forms. In various examples, tagged data objects may be image data objects, video data objects, audio data objects, database records, or social media posts. In an embodiment, image data objects can include GIF images, PNG images, BMP images, TIFF images, image files, or bitmaps. For example, tags for an image data object may include subject information obtained via facial recognition, resolution information, geolocation information, image format information, copyright information, or photographer information. Social media posts may include tweets, Facebook posts, videos, YouTube posts, or images uploaded to an image-sharing site. Tags for social media posts may include authorship information, copyright information, Facebook groups, friend groups, groups of users, or hashtags. Video data objects may include MOV files, video streams, or MPEG files. In an embodiment, tags for a video object may include the length of the video, a genre for the video, a source for the video, copyright information for the video, actor, director, and studio information, as well as video resolution information. Audio data objects may include MP3 files, audio streams, raw audio bit streams, or AAC files. In an embodiment, audio file tags may include artist information, band information, genre information, copyright information, and album information. Those skilled in the art will appreciate that the process described herein can be used for other types of tagged data and other types of tags. In an embodiment, the set of tags may include multiple types of tags in a single sharing operation.

Figure 8:
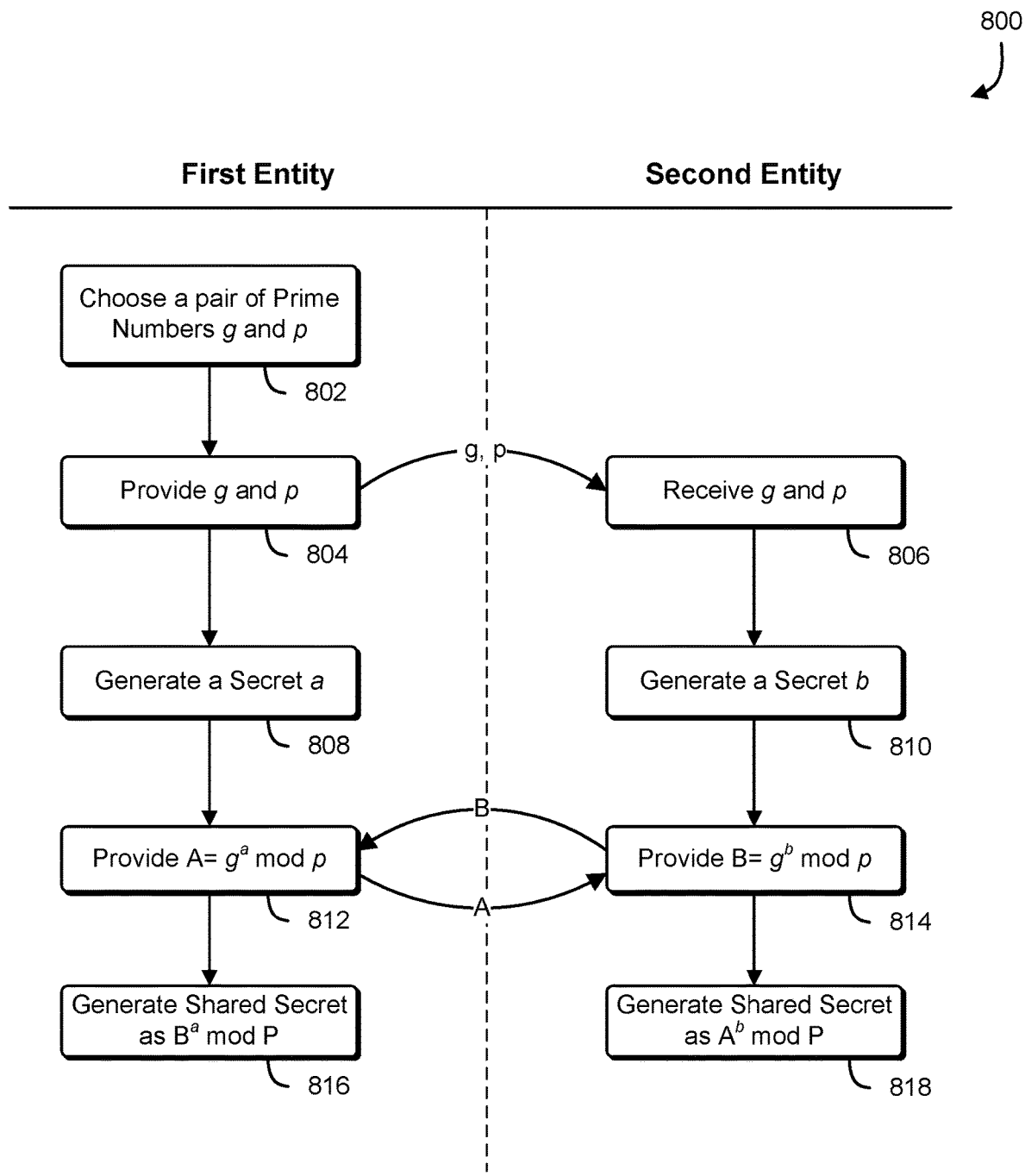
FIG. 8 illustrates a process that, as a result of being performed by a first entity and a second entity, establishes a shared secret, in an embodiment.

In various examples, the first entity and the second entity may be any combination of client computer systems, mobile devices, tablet devices, laptop computer systems, virtual computer systems, network-connected devices, computing runtimes, serverless execution environments, or computer processing entity. In an example, at blocks 602 and 604, the first entity and the second entity perform a key exchange process to obtain a shared key. The key exchange process may be a cryptographic key exchange process such as the Diffie Hellman key exchange or an asymmetric key exchange relying on a symmetric key cryptography. An example of a Diffie Hellman key exchange process is illustrated in FIG. 8.

In some examples, the first entity and the second entity authenticate their respective identities to each other as part of the process. Such bilateral authentication can be accomplished in a variety of ways, such as by establishing a transport layer security ("TLS") connection that includes both client and server side authentication. In some examples, digital certificates are exchanged between the entities, and each entity verifies the identity of the other by verifying a digital signature provided by the other using a public key included in the other entity's digital certificate. Validity of the digital certificate by be determined by validating a digital signature on the digital certificate using a public key maintained in a list of trusted certificate authorities stored in a trust store on the computer system. In some implementations, the shared key may be generated as a bi-product of establishing the TLS connection (such as reuse of the pre-master secret). In other implementations, the shared key may be negotiated separately from the establishment of the secure connection.

At block 606, the first entity identifies a first set of tags associated with a first set of tagged data objects that are accessible to the first entity. The first set of tagged data objects is a set of tagged images stored on an image storage service and secured with an account associated with the first entity. The first set of tags is identified by a first user as tags associated with tagged data objects to be shared. At block 608, the second entity identifies a second set of tags associated with a second set of tagged data objects that are accessible to the second entity. The second set of tagged data objects is a set of tagged images stored on the image storage service and secured with an account associated with the second entity. The second set of tags is identified by a second user as tags associated with tagged data objects that may be shared.

At blocks 610 and 612, the first entity and the second entity determine a set of shared tags that consists of an intersection between the first set of tags and the second set of tags. In an embodiment, the set of shared tags is determined using a private set intersection protocol. A variety of private set intersection protocols is known to those of ordinary skill in the art of cryptography, and in various embodiments, many of these varieties may be used. In many implementations, the private set intersection protocol is a mutual private set intersection protocol in which neither party has an advantage in determining the elements outside the set intersection in the other set of tagged objects. Examples of private set intersection protocols may be found in:

Michael J. Freedman, Kobbi Nissim, and Benny Pinkas. Efficient private matching and set intersection. In EUROCRYPT, pages 1-19, 2004.

D. Dachman-Soled, T. Malkin, M. Raykova, and M. Yung. Efficient robust private set intersection. In Applied Cryptography and Network Security (ACNS '09), volume 5536 of Lecture Notes in Computer Science, pages 125-142, 29.

D. Dachman-Soled, T. Malkin, M. Raykova, and M. Yung. Multi-party secure set intersection and computing with multivariate polynomials. Columbia University, 2010.

Benny Pinkas, Thomas Schneider, Gil Segev, and Michael Zohner. Phasing: Private set intersection using permutation-based hashing. In 24th USENIX Security Symposium, USENIX Security 15, Washington, D.C., USA, Aug. 12-14, 2015, pages 515-530, 2015.

Peter Rindal and Mike Rosulek. Improved private set intersection against malicious adversaries. In Advances in Cryptology—EUROCRYPT 2017—36th Annual International Conference on the Theory and Applications of Cryptographic Techniques, Paris, France, Apr. 30-May 4, 2017, Proceedings, Part I, pages 235-259, 2017.

Peter Rindal and Mike Rosulek. Malicious-secure private set intersection via dual execution. In Proceedings of the 2017 ACM SIGSAC Conference on Computer and Communications Security, CCS 2017, Dallas, Tex., USA, Oct. 30-Nov. 03, 2017, pages 1229-1242, 2017.

Additional examples of private set intersection protocols are described in "Practical Private Set Intersection Protocols with Linear Computational and Bandwidth Complexity" by Emiliano De Cristofaro and Gene Tsudik, University of Calif., Irvine, which is available at https://eprint.iacr.org/29/491.pdf, the contents of which is incorporated by reference herein.

In an example, at block 614 the first entity identifies those data objects, from the first set of tagged data objects, that are associated with the intersection of tags determined above at block 610. For each of the identified data objects, the first entity determines a hash value that is based at least in part on the shared key determined at block 602. In an embodiment, the hash value is a cryptographic hash. In an embodiment, the hash value is a checksum. In an embodiment, the hash value is a cyclic redundancy code. In an embodiment, the hash value is a message authentication code. In an embodiment, the hash value is an object identifier or filename. At block 616, the second entity identifies those data objects, from the second set of tagged data objects, that are associated with the intersection of tags determined above at block 612. For each of the identified data objects, the second entity determines a hash value that is based at least in part on the shared key determined at block 604. The hash value is determined similarly to the hash value determined by the first entity at block 614.

At blocks 618 and 620, the first entity and the second entity determine an intersection of their respective sets of hashes. The intersection of the hashes is associated with a set of tagged data objects that are accessible to both entities. Using this information, the first entity identifies 622 a set of common data objects that are accessible to both entities. The first entity then provides 626, to the second entity, tagged data objects that are associated with the intersection of tags that are not already accessible to both entities. The second entity also identifies 624 the intersection of tagged data objects that are associated with the intersection of tags, and provides 628 to the first entity, tagged data objects that are associated with the intersection of tags that are not already accessible to both entities.

In some examples, tagged data objects may be provided in an alternative fashion by providing one data object at a time to the other party in exchange for a data object provided by the other party. The ratio of data objects provided to data objects received may be limited to a fraction specified by an administrator of each entity. Exceeding the ratio may result in no further data objects being sent, or by limiting the transmission bandwidth to a threshold amount that does not excessively burden the networking resources of the entity.

Figure 7:
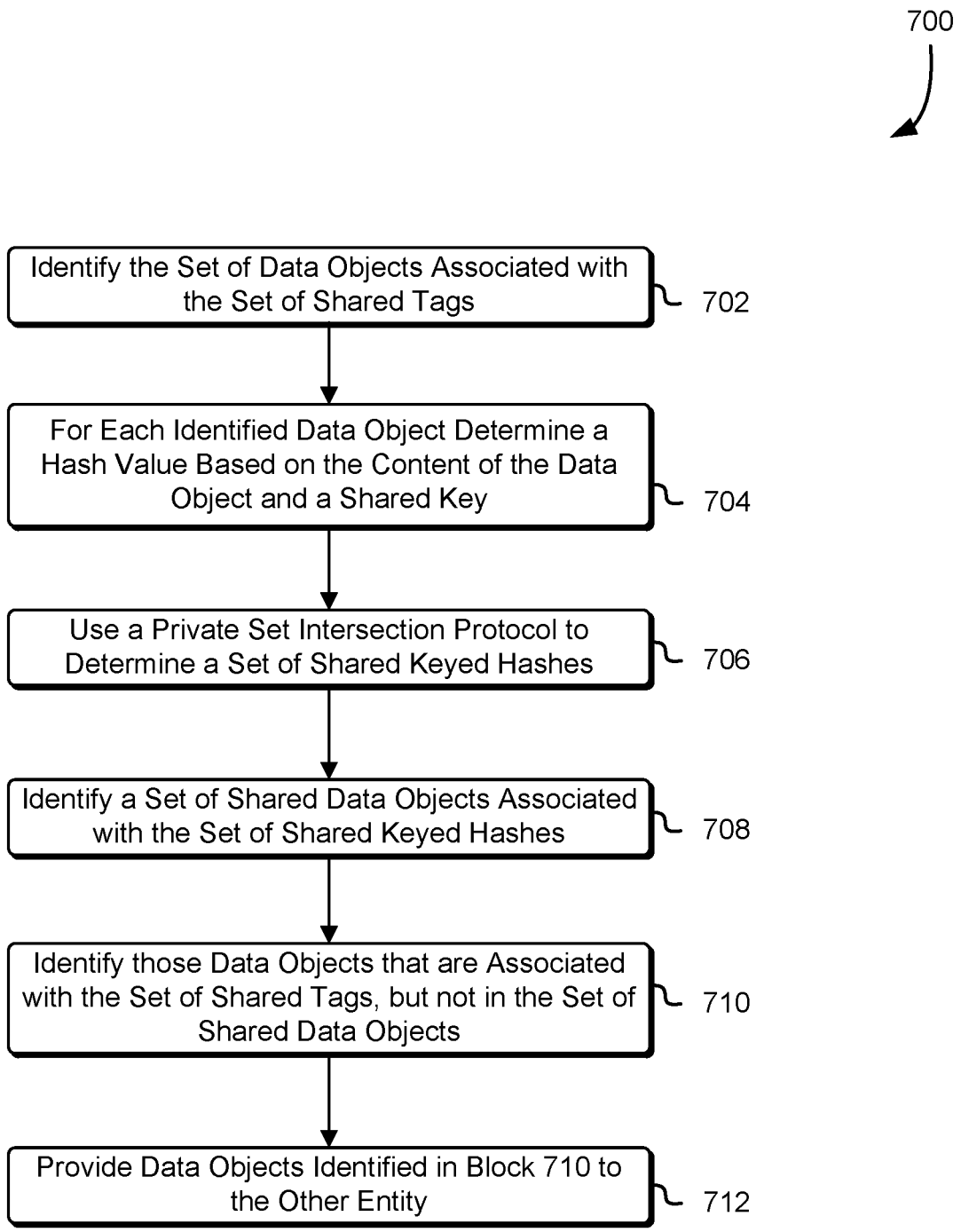
FIG. 7 illustrates a process that, as a result of being performed by an entity, determines a private set intersection of a set of data objects, in an embodiment.

FIG. 7 illustrates a process 700 that, as a result of being performed by a first entity, determines a private set intersection of a first set of tagged data objects associated with the first entity, and a second set of tagged data object associated with a second entity, in an embodiment. In various examples, the first entity may be a client computer system, a cell phone, a computing device, or a service. At block 702, the first entity identifies a set of objects that are associated with a set of shared tags. In an example, the set of data objects consists of those tagged data objects that may be shared with the second entity. In some implementations, in order to share the tagged data objects efficiently, it is desirable to identify those objects that are already accessible to the second entity, and provide only the remaining objects. Doing so generally improves the operation of the computer system by reducing the amount of data that needs to be transmitted between the first entity and the second entity.

At block 704, the first entity determines a proxy value to be used in place of each data object for the sake of comparison with other data objects. The data value itself may be used as part of a private set intersection protocol, however, for other embodiments (such as where the objects are large video files), using the data value itself would be unnecessarily cumbersome and the set intersection can be more easily determined using a proxy value such as an authentication code, checksum, or hash value associated with each object. In some examples, a proxy value is determined for each data object, and the proxy values associated with a pair of objects are compared to determine whether the pair of objects is matching. The proxy value may be a cryptographic hash, hash value, or message authentication code that utilizes a shared secret such as a cryptographic key known by both the first entity and the second entity. In some examples, the shared secret may be established as part of a key-exchange algorithm such as the Diffie Hellman algorithm as described in FIG. 8 below. By using a shared secret when determining the proxy value, increased privacy of the entities may be attained.

At block 706, the first entity and the second entity performed private set intersection protocol to identify a set of shared hashes (or proxy values). The set of shared hashes is then used to identify 708 those data objects that are known to both the first entity and the second entity. At block 710, the first entity determines a set of data objects to be sent to the second entity by removing the identified data objects that are known to both a first entity and the second entity from the set of data objects that are associated with the set of shared tags. At block 712, the first entity sends the determined set of data objects to the second entity. The first entity receives a corresponding set of data objects from the second entity that are then added to the set of tagged data available to the first entity. As a result of this exchange, both a first entity and the second entity have a matching set of tagged data objects that are associated with the set of shared tags.

FIG. 8 illustrates a process 800 that, as a result of being performed by a first entity and a second entity, establishes a shared secret, in an embodiment. Values may be exchanged between the first entity and the second entity over a computer network or other communication medium that may allow other third parties to view the communication. Nonetheless, in many examples, a third party will be unable to easily determine the shared secret without significant effort. In an embodiment, the process begins at block 802 with a first entity choosing a pair of prime numbers g and p. In an embodiment, at block 804, the first entity provides g and p to the second entity. In an embodiment, at block 806, the second entity receives g and p and saves them for later use.

At block 808, the first entity generates a random secret a. In an embodiment, at block 810, the second entity generates a random secret b. The random secrets may be generated using a pseudorandom process and a seed value or a random number generator. At block 812, the first entity determines a value $A = g^a \mod p$, and provides A to the second entity. At block 814, the second entity determines a value $B = g^b \mod p$, and provides B to the first entity.

The first entity and the second entity are able to compute a shared secret using the values provided by the other party and their own secret value. At block 816, the first entity determines the shared secret by calculating $B^a \mod p$. At block 818, the second entity determines the shared secret by calculating $A^b \mod p$. Because of the properties of exponents, it can be shown that both the first entity and the second entity compute the same secret value because $B^a \mod p = A^b \mod p$. In other examples, other key-exchange algorithms may also be used to establish a shared secret between two parties.

Figure 9:
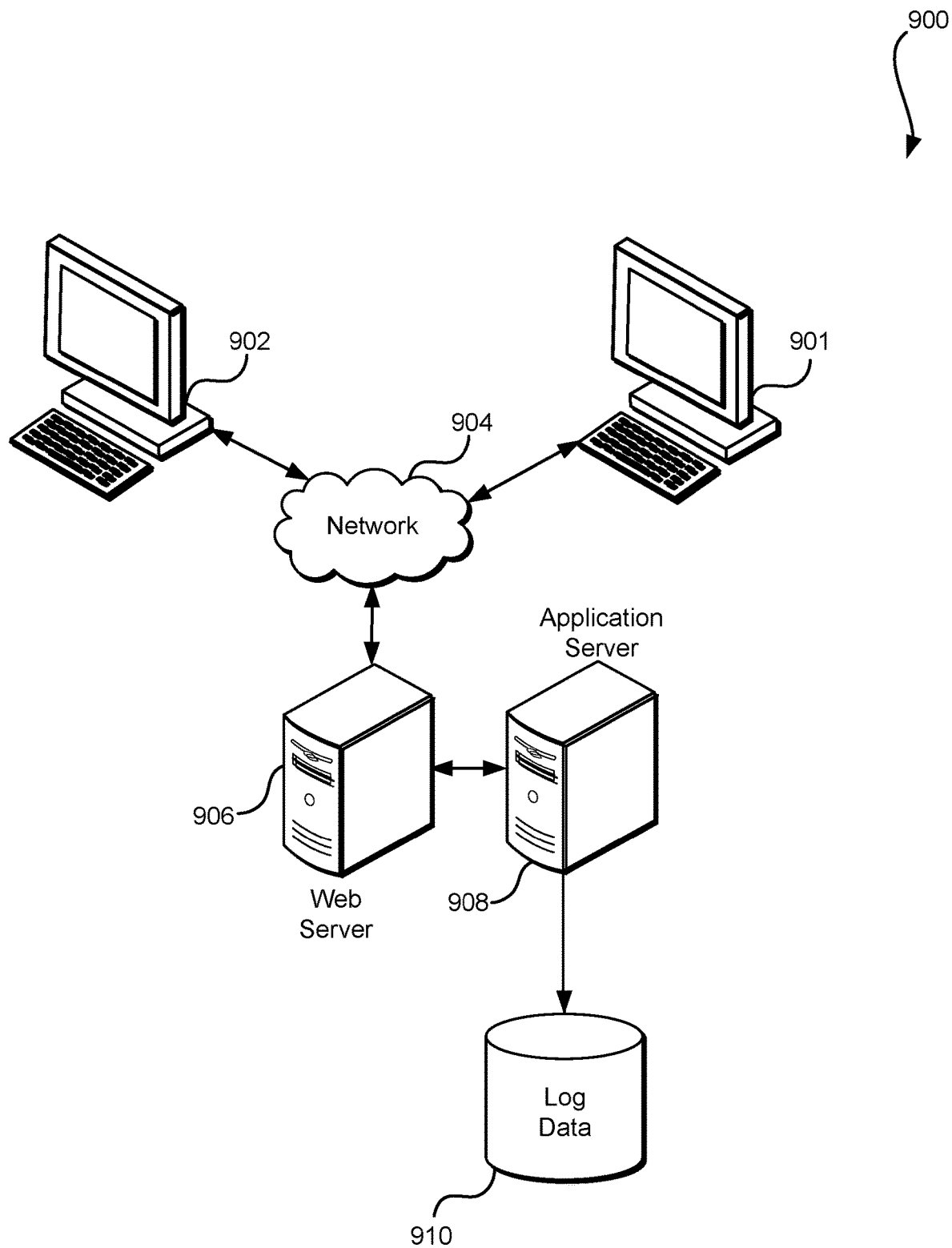
FIG. 9 illustrates a system in which various embodiments can be implemented.

FIG. 9 illustrates aspects of an example system 900 for implementing aspects in accordance with an embodiment. As will be appreciated, although a web-based system is used for purposes of explanation, different systems may be used, as appropriate, to implement various embodiments. In an embodiment, the system includes a first electronic client device 901 and a second electronic client device 902. An electronic client device may include any appropriate device operable to send and/or receive requests, messages, or information over an appropriate network 904 and convey information back to a user of the device. Communication between the first client device 901 and the second client device 902 may occur in a peer-to-peer fashion, or via a network server intermediary. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly-addressable communications network, as the system includes a web server 906 for receiving requests and serving content in response thereto, although for other networks an alternative device serving a similar purpose could be used as would be apparent to one of ordinary skill in the art.

The illustrative system includes at least one application server 908 and a data store 910 and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object level interfaces. The application server can include any appropriate hardware, software and firmware for integrating with the data store as needed to execute aspects of one or more applications for the client device, handling some or all of the data access and business logic for an application.

The application server provides access control services in cooperation with the data store and generates content including, but not limited to, text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including, but not limited to, forms that are perceptible to the user audibly, visually and/or through other senses. The handling of all requests and responses, as well as the delivery of content between the first client device 901 and the application server 908, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 910, in an embodiment, includes several separate data tables, databases, data documents, dynamic data storage schemes and/or other data storage mechanisms and media for storing data relating to a particular aspect of the present disclosure. In an embodiment, the data store is shown to include a mechanism for storing log data, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 910.

The data store 910, in an embodiment, is operable, through logic associated therewith, to receive instructions from the application server 908 and obtain, update or otherwise process data in response thereto and the application server 908 provides static, dynamic, or a combination of static and dynamic data in response to the received instructions. In an embodiment, dynamic data, such as data used in web logs (blogs), shopping applications, news services, and other such applications are generated by server-side structured languages as described herein or are provided by a content management system ("CMS") operating on, or under the control of, the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the first client device 901. Continuing with example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 900 and/or another system, such as for launching, terminating, deleting, modifying, reading, and/or otherwise accessing such computing resources.

Each server typically includes an operating system that provides executable program instructions for the general administration and operation of that server and includes a computer-readable storage medium (e.g., a hard disk, random access memory, read only memory, etc.) storing instructions that, if executed (i.e., as a result of being executed) by a processor of the server, cause or otherwise allow the server to perform its intended functions.

The system 900, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols and such a system also includes a number of workstations running any of a variety of commercially-available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that run one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

In an embodiment, numerous variations utilize symmetric and/or asymmetric cryptographic primitives. Symmetric key algorithms may include various schemes for performing cryptographic operations on data including block ciphers, stream ciphers, and digital signature schemes. Example symmetric key algorithms include the advanced encryption standard (AES), the data encryption standard (DES), triple DES (3DES), Serpent, Twofish, blowfish, CASTS, RC4 and the international data encryption algorithm (IDEA). Symmetric key algorithms may also include those used to generate output of one way functions and include algorithms that utilize hash-based message authentication codes (HMACs), message authentication codes (MACs) in general, PBKDF2, and Bcrypt. Asymmetric key algorithms may also include various schemes for performing cryptographic operations on data. Example algorithms include those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS#1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme and the ECQV implicit certificate scheme. Other algorithms and combinations of algorithms are also considered as being within the scope of the present disclosure and the above is not intended to be an exhaustive list.

Note that the term "digital signature" includes any information usable to cryptographically verify authenticity of a message including information generated using an RSA-based digital scheme (such as RSA-PSS), the digital signature algorithm (DSA) and the elliptic curve digital signature algorithm, the ElGamal signature scheme, the Schnorr signature scheme, the Pointcheval-Stern signature algorithm, the Rabin signature algorithm, pairing-based digital signature schemes (such as the Boneh-Lynn-Schacham signature scheme), undeniable digital signature schemes, and others. Further, message authentication codes (such as hash-based message authentication codes (HMACs), keyed cryptographic hash functions, and other types of information may also be used as digital signatures.

In various embodiments, data objects having message authentication codes may be cryptographically verifiable. In one example, cryptographically verifiable data objects are created to be cryptographically verifiable by the system to which the data object is to be provided or another system that operates in conjunction with the system to which the data object is to be provided. For example, the data object may be encrypted so as to be decryptable by the system that will cryptographically verify the data object, where the ability to decrypt the data object serves as cryptographic verification of the data object. As another example, the data object may be digitally signed (thereby producing a digital signature of the data object) such that the digital signature is verifiable by the system that will cryptographically verify the data object. In other examples, both encryption and digital signatures are used for cryptographic verifiability and/or security. The key used to encrypt and/or digitally sign the data object may vary in accordance with various embodiments and the same key is not necessarily used for both encryption and digital signing, where applicable. In some embodiments, a key used to encrypt the data object is a public key of a public/private key pair where the private key of the key pair is maintained securely by the system to which the data object is to be provided, thereby enabling the system to decrypt the data object using the private key of the key pair. Using the public key to encrypt the data object may include generating a symmetric key, using the symmetric key to encrypt the data object, and encrypting the symmetric key using the public key, where the encrypted symmetric key is provided to a system with the encrypted data object to enable the system to use the corresponding private key to decrypt the symmetric key and use the decrypted symmetric key to decrypt the data object. Further, in some embodiments, the data object is digitally signed using a private key of a public/private key pair corresponding to the computer system that encrypts and/or digitally signs the data object (e.g., a user device). For example, an application may be provisioned with the private key and the data object may include a certificate for the private key for use by a system for verification of the digital signature of the data object. Other variations, including variations where a symmetric key shared between the user computer and the system that cryptographically verifies the data object can be used to encrypt and/or digitally sign the data object.

The phrase "one-way function" includes functions that are not necessarily one-way in the strict mathematical sense, but that exhibit properties (such as collision resistance, preimage resistance and second preimage resistance) that render the function useful in contexts in which the various techniques of the present disclosure are applied. In this manner, an entity with output of the function but without access to the corresponding input, is unable to determine the input without, for instance, extraordinary expenditure of computational resources necessary for a cryptographic (e.g., brute force) attack. One-way functions (also referred to as "effectively one-way functions") include, but are not limited to, cryptographic hash functions such as message authentication codes, (e.g., hash based message authentication code (HMAC)), key derivation functions, such as PBKDF2 and bcrypt (with the password being based at least in part on the plaintext and the cryptographic key, e.g.) and other secure randomization functions which may, but do not necessarily, have a domain (set of possible inputs) that is larger than their range (possible outputs). Other suitable functions (referred to as "f") for various embodiments include, but are not limited to, functions that take at least a plaintext and cryptographic key as input and that have a property of preimage resistance (given a value y, the probability of randomly generating an input x such that $f(x)=y$ is below a specified threshold), second preimage resistance (given an input x1, the probably of randomly generating another input x2, different from x1, such that f(x1)=f(x2) is below a specified threshold) and/or collision resistance (the probability of two different inputs resulting in the same output is less than a specified threshold). The exact threshold for each probability may be context-dependent, with lower probabilities corresponding to higher security contexts. A value can be cryptographically derived using a one-way function. An encryption function can be (or can be a component of) a one-way function from the perspective of an entity that lacks information (e.g., cryptographic key and/or salt) used as input into the encryption function. Hash functions usable as one-way functions in accordance with the techniques of the present disclosure include, but are not limited to, functions described in the National Institute of Standards and Technology (NIST) Special Publication 800-107, Revision 1 "Recommendation for Applications Using Approved Hash Algorithms," which is incorporated herein by reference. The phrase cryptographically derived means using a one way function at least once using inputs that are the values or derived from the values (possibly cryptographically derived from the values). For example, an encryption operation is one-way to entities that do not have the decryption key.

The short-range communication channel may be established using various technologies, such as induction wireless, infrared wireless (such as technologies operating according to specifications and protocols provided by the Infrared Data Association, or IrDA) or ultra wideband formats. In some embodiments, the first and second devices may utilize short-range, low-power and high-frequency radio transmissions, such as Bluetooth®. In still other embodiments, the first and second devices may support acoustic-based data transfer. For example, the second device may include software components and a speaker that enable the second device to broadcast data to the first device as sound waves, while the first device may include software components and microphone that enable the second device to receive the data embedded in the sound waves. Thus, one or more of radio signal-based data transfer (e.g., near field communication (NFC) or Bluetooth®), light-based data transfer (e.g., infrared data transfer), an acoustic-based data transfer (e.g., sound wave-embedded data), or magnetic field-based transfer (e.g., reading data from a magnetic stripe) may be used for inter-device communication. The protocols and components for enabling computing devices to perform the systems and methods of the present disclosure using such means for inter-device communication are well known to those skilled in the art of computer communications and thus, need not be described in more detail herein. Generally, embodiments described herein are not limited to those explicitly illustrated herein.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs, or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer systems comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   performing a key-exchange process to determine a shared key between a first entity and a second entity, the first entity including a first digital media data set including a first set of tags of attributes of first digital media items of the first digital media data set, and the second entity including a second digital media data set including a second set of tags of attributes of second digital media items of the second digital media data set, the first and second sets of tags of attributes include one or more of:
     a modification time,
     resolution data,
     encoding parameters, or
     author information;
   using a private-set intersection protocol directly between the first and second entities to determine an intersection of the first set of tags and the second set of tags of attributes based at least in part on an intersection of the first and second sets of tags of attributes including an intersection of one or more of:
     the modification time,
     the resolution data,
     the encoding parameters, or
     the author information;
   determining a third digital media data set comprising data items including tags in the intersection of one or more of:
     the modification time,
     the resolution data,
     the encoding parameters, or
     the author information;
   using the shared key to determine a set of authentication codes for the third digital media data set;
   using the private-set intersection protocol and the set of authentication codes to determine a refined third digital media data set from the third digital media data set by removing from the third digital media data set items that are in both the first digital media data set and the second digital media data set; and
   transmitting the refined third digital media data set to the second entity including transmitting a plurality of digital media data items determined to have matching tags in the intersection of one or more of:
     the modification time,
     the resolution data,
     the encoding parameters, or
     the author information.

2. The computer-implemented method of claim 1, further comprising:
   obtaining a fourth data set from the second entity; and
   adding the fourth data set to the first data set.

3. The computer-implemented method of claim 1, wherein each authentication code in the set of authentication codes is based at least in part on a cryptographic hash of contents of a data element and the shared key.

4. The computer-implemented method of claim 1, wherein the first data set and the second data set are sets of image data objects, digital photos, video data objects, or audio data objects.

5. A system, comprising:
one or more processors; and
memory that stores computer-executable instructions that, if executed, cause the system to:
use a first peer-to-peer private-set-intersection protocol to identify a set of tags associated with attributes of both a first set of tagged data on a first computer system and a second set of tagged data on a second computer system, the attributes including one or more of:
a geographic location,
a creation time,
encoding parameters, or
author information;
use a second private-set-intersection protocol to identify an intersection of the first set of tagged data and the second set of tagged data, including identifying an intersection of one or more of:
the geographic location,
the creation time,
the encoding parameters, or
the author information; and
transmit, from the first computer system to the second computer system, data that is in the first set of tagged data and not in the intersection, including transmitting data determined to be in the intersection of one or more of:
the geographic location,
the creation time,
the encoding parameters, or
the author information.

6. The system of claim 5, wherein the computer-executable instructions, if executed, further cause the system to:
obtain information that identifies a. logical combination of tags; and
identify the first set of tagged data based on the logical combination of tags.

7. The system of claim 5, wherein the computer-executable instructions, if executed, further cause the system to:
generate a set of authentication codes for one or more pieces of tagged data in the first set of tagged data; and
perform the second private-set-intersection protocol using the set of authentication codes.

8. The system of claim 7, wherein the set of authentication codes are based at least in part on a shared secret generated as a result of a key-exchange process performed by the first computer system and the second computer system.

9. The system of claim 5, wherein the computer-executable instructions, if executed, further cause the system to:
obtain, from the second computer system, data that is in the second set of tagged data and not in the intersection; and
store the data obtained from the second computer system.

10. The system of claim 5, wherein the first private-set-intersection protocol and the second private-set-intersection protocol are performed between the first computer system and the second computer system without involvement of a third trusted entity.

11. The system of claim 5, wherein the first private-set-intersection protocol and the second private-set-intersection protocol are the same protocol.

12. The system of claim 5, wherein:
the first set of tagged data and the second set of tagged data are posts to a social media service; and
each individual post in the first set of tagged data and the second set of tagged data includes a tag that identifies a subject of the individual post.

13. A non-transitory computer-readable storage medium comprising stored thereon executable instructions that, as a result of being executed by one or more processors of a computer system, cause the computer system to at least:
use a first private-set-intersection protocol to identify a set of tags associated with both a first set of tagged digital image data on a first computer system and a second set of tagged digital image data on a second computer system, the first private-set-intersection protocol implemented as a two-party protocol and the tags associated with one or more of:
a geographic location,
a creation time,
a modification time, or
resolution data;
use a second private-set-intersection protocol to identify an intersection of the first set of tagged digital image data and the second set of tagged digital image data, including identifying an intersection of one or more of:
the geographic location,
the creation time,
the modification time, or
the resolution data; and
transmit, from the first computer system to the second computer system, digital image data that is in the first set of tagged digital image data and not in the intersection of one or more of:
the geographic location,
the creation time,
the modification time, or
the resolution data.

14. The non-transitory computer-readable storage medium of claim 13, wherein the executable instructions further comprise instructions that, as a result of being executed by the one or more processors, cause the computer system to obtain, from the second computer system, digital image data that is in the second set of tagged digital image data and not in the intersection.

15. The non-transitory computer-readable storage medium of claim 14, wherein the executable instructions further comprise instructions that, as a result of being executed by the one or more processors, cause the computer system to add the digital image data obtained from the second computer system to the first set of tagged digital image data.

16. The non-transitory computer-readable storage medium of claim 13, wherein:
the first computer system and the second computer system are clients of an image sharing service; and
the image sharing service facilitates an exchange of images between the first computer system and the second computer system.

17. The non-transitory computer-readable storage medium of claim 13, wherein the executable instructions further comprise instructions that, as a result of being executed by the one or more processors, cause the computer system to:

generate a hash of each digital image data object in the first set of tagged digital image data; and use the hash of each digital image data object in the first set of tagged digital image data to perform the second private-set-intersection protocol.

18. The non-transitory computer-readable storage medium of claim 17, wherein the executable instructions further comprise instructions that, as a result of being executed by the one or more processors, cause the computer system to:

generate a shared cryptographic key that is accessible to the first computer system and the second computer system; and use the shared cryptographic key to generate the hash of each digital image data object in the first set of tagged digital image data.

19. The non-transitory computer-readable storage medium of claim 13, wherein the first-private-intersection protocol and the second private-intersection-protocol are one-way private intersection protocols.

20. The non-transitory computer-readable storage medium of claim 13, wherein:

the first set of tagged digital image data and the second set of tagged digital image data are sets of image data objects; and the set of tags is associated with a set of faces recognized in the sets of image data objects.

\* \* \* \* \*